US012657159B2

(12) United States Patent　　　　　(10) Patent No.: US 12,657,159 B2
Wu　　　　　　　　　　　　　　　　　　(45) Date of Patent: Jun. 16, 2026

(54) INDEX NODE ALLOCATION METHOD, DATA PROCESSING DEVICE AND COMPUTER-READABLE MEDIUM

(71) Applicant: QNAP Systems, Inc., New Taipei City (TW)

(72) Inventor: Tsu-Yu Wu, New Taipei City (TW)

(73) Assignee: QNAP Systems, Inc., New Taipei City (TW)

( * ) Notice: Subject to any disclaimer, the term of this patent is extended or adjusted under 35 U.S.C. 154(b) by 329 days.

(21) Appl. No.: 17/646,455

(22) Filed: Dec. 29, 2021

(65) Prior Publication Data

US 2022/0405240 A1　　Dec. 22, 2022

Related U.S. Application Data

(60) Provisional application No. 63/211,002, filed on Jun. 16, 2021.

(30) Foreign Application Priority Data

Dec. 17, 2021　(TW) ................................. 110147495

(51) Int. Cl.
　　*G06F 16/13*　　　(2019.01)
　　*G06F 16/16*　　　(2019.01)
(52) U.S. Cl.
　　CPC .......... *G06F 16/134* (2019.01); *G06F 16/137* (2019.01); *G06F 16/164* (2019.01)
(58) Field of Classification Search
　　CPC .... G06F 16/134; G06F 16/137; G06F 16/164; G06F 16/01
　　USPC .......................... 707/696, 741, 797, 822, 825
　　See application file for complete search history.

(56) References Cited

U.S. PATENT DOCUMENTS

| | | | |
|---|---|---|---|
| 2007/0118578 A1 | 5/2007 | Ahrens et al. | |
| 2009/0019047 A1* | 1/2009 | Anderson | ........... G06F 16/1774 |
| | | | 707/999.008 |
| 2011/0040810 A1* | 2/2011 | Kaplan | ................... G06F 16/11 |
| | | | 707/822 |
| 2015/0278397 A1* | 10/2015 | Hendrickson | ....... G06F 16/9024 |
| | | | 707/798 |

(Continued)

FOREIGN PATENT DOCUMENTS

| | | |
|---|---|---|
| TW | 200817949 A | 4/2008 |
| TW | I372345 B | 9/2012 |

OTHER PUBLICATIONS

Office Action and Search Report issued in Chinese Application No. 202210129194, mailed Mar. 26, 2026, with English machine translation.

*Primary Examiner* — Phong H Nguyen
(74) *Attorney, Agent, or Firm* — HSML P.C.

(57)　　　　　　　ABSTRACT

An index node (inode) allocation method, a corresponding data processing device and a corresponding computer-readable medium are provided. The method is applicable to a file system and includes the following steps: allocating a range including a plurality of consecutive inodes to a directory in the file system when a directory order mode is already activated, wherein files in the directory are sorted according to hash values of the files; dividing the range of inodes into a plurality of sub-regions; and when a new file is created in the directory, selecting one of the sub-regions according to a hash value of the new file, so as to allocate an inode in the selected sub-region to the new file.

9 Claims, 6 Drawing Sheets

(56)          References Cited

U.S. PATENT DOCUMENTS

2018/0067786 A1*    3/2018    Nguyen Trung  ....... G06F 9/544
2021/0216379 A1*    7/2021    Luo .................... G06F 11/1438

* cited by examiner

INDEX NODE ALLOCATION METHOD, DATA PROCESSING DEVICE AND COMPUTER-READABLE MEDIUM

BACKGROUND

1. Technical Field

The present disclosure relates to index nodes (inodes) of a file system, and more particularly, to a method, a data processing device and a computer-readable medium for index node allocation.

2. Description of Related Art

Currently, file systems use inodes to store metadata of files, such as file creation time, modification time, access mode and size, as well as the storage locations of file data in the storage device such as hard disk. In order to quickly look up the metadata of the files in a file system, such as the ZFS file system, a hash algorithm may be used. For example, the directory may be divided into multiple blocks. The even distribution characteristics of the hash algorithm can be utilized to evenly correspond the files in the same directory to the blocks, and then record the inode number of each file in the corresponding block. In this way, it is unnecessary to scan the entire directory to look up the metadata of a file. Instead, only the directory block corresponding to the hash value of the file needs to be scanned to obtain the inode number of the file to read the metadata.

However, the distribution characteristics of the hash algorithm are not beneficial to directory traversal. In addition, a typical file system allocates consecutive unused inodes one by one to each file according to the order of creation time of the files, and files created consecutively are often not in the same directory. Therefore, the positions of inodes of files in the same directory are not spatially-correlated. Instead, the positions of inodes of files in the same directory are in a widely distributed configuration. Hence, when it is necessary to traverse all the files and their metadata in a large directory containing many files, the inodes scattered in a large storage space must be read randomly, resulting in slow processing speed.

In addition, the above metadata may further include the extended attributes (EA) and/or the access control list (ACL) of a file. Since these metadata have no length limitation, sometimes the extended attributes and/or the access control list is/are too large to be stored in the header of the inode, and an additional inode must be allocated to store these metadata, which increases the number of inodes, makes them more distributed, and further reduces the processing speed of directory traversal.

In the prior art, the inode may be enlarged to store a large amount of metadata, such as extended attributes and/or an access control list. Such metadata may be regarded as embedded in the inode. However, when the amount of metadata is small, the storage space of the enlarged inode is wasted. Hence, it is not easy to pre-estimate the appropriate size of the inode. Further, when the inodes are enlarged, the storage space containing the inodes must be enlarged accordingly, that is, the distribution range of the inodes are expanded accordingly, which worsens the random scattering of the inodes. Therefore, a technique is needed to at least solve the above-mentioned problems.

SUMMARY

In view of the aforementioned problems of the prior art, the present disclosure provides an index node allocation method. The index node allocation method is applicable to a file system and the index node allocation method includes: allocating a range including a plurality of consecutive inodes to a directory in the file system when a directory order mode is already activated, wherein a plurality of files in the directory are sorted according to hash values of the files; dividing the range into a plurality of sub-regions; and selecting one of the sub-regions according to a hash value of a new file when the new file is created in the directory to allocate an inode of the selected one of the sub-regions for use by the new file.

The present disclosure also provides a data processing device including a file system for executing the above index node allocation method.

The present disclosure further provides a computer-readable medium applicable to a data processing device and storing instructions for executing the above index node allocation method.

In the present disclosure, the inodes of the files in the same directory are consecutively arranged in the order of directory traversal to speed up the processing of traversal of large directories.

BRIEF DESCRIPTION OF THE DRAWINGS

The present disclosure can be more fully understood by reading the following descriptions of the embodiments, with reference made to the accompanying drawings.

DETAILED DESCRIPTION OF THE EMBODIMENTS

The following examples are used for illustrating the present disclosure. A person skilled in the art can easily conceive the other advantages and effects of the present disclosure, based on the disclosure of the specification. The present disclosure can also be implemented or applied as described in different examples. It is possible to modify or alter the following examples for carrying out this disclosure without contravening its spirit and scope, for different aspects and applications.

It is further noted that, as used in this disclosure, the singular forms "a," "an," and "the" include plural referents unless expressly and unequivocally limited to one referent. The phrase "and/or" indicates that a plurality of features, elements or components are to be taken individually or some of the features, the elements or the components are to be taken together.

Figure 1:
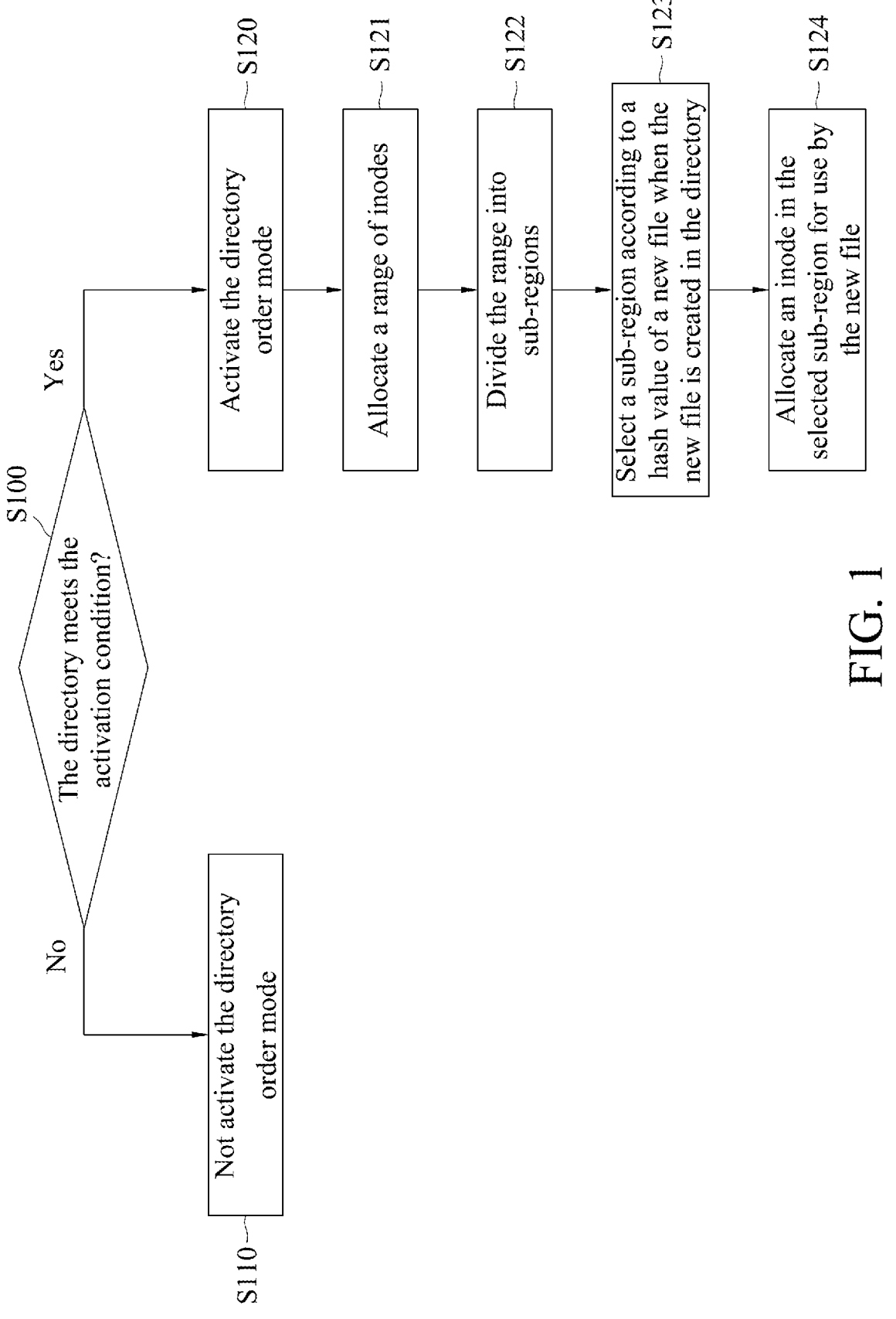
FIG. 1 is a flowchart of an index node allocation method according to an embodiment of the present disclosure.

Please refer to FIG. 1, which is a flowchart of an index node allocation method according to an embodiment of the present disclosure. In this embodiment, the method is executed by a file system, and the method is applicable to any directory in the file system.

In addition, in order to speed up the directory traversal, the files in the directory may be sorted according to the hash values of the files. The hash values of the files may be the hash values of the names of the files, or hash values calculated from the metadata or other related data of the files. The flow of the method in FIG. 1 is described below.

First, in step S100, it is checked whether the directory meets the activation condition of the directory order mode. For example, the activation condition may be that the total number of inodes used by all files in the directory is greater than a preset threshold value. If the directory does not meet the activation condition, the flow proceeds to step S110. Otherwise, if the directory already meets the activation condition, the flow proceeds to step S120.

In step S110, the file system does not activate the directory order mode. At this moment, consecutive unused inodes are allocated one by one to files in the entire file system according to the order of file creation time.

In step S120, the file system activates the directory order mode.

In step S121, when the directory order mode is already activated, the file system allocates a range or a region including k consecutive inodes in the unused inodes for use by the files in the directory. In an embodiment, the range may be expressed as $(I_x, I_{x+k-1})$, wherein $I_x$ and $I_{x+k-1}$ are respectively the first inode and the last inode of the range, x is the number of the first inode, k is an integer greater than 1, and x+k−1 is the number of the last inode.

In step S122, the range or the region is divided into a plurality of sub-regions. In an embodiment, each sub-region includes the same number of inodes. For example, the k inodes of the range may be divided into L sub-regions, wherein L is an integer greater than 1, and the sub-regions may be expressed as $(I_x, I_{x+k/L-1})$, $(I_{x+k/L}, I_{x+2k/L-1})$, . . . , $(I_{x+(L-1)k/L}, I_{x+k-1})$.

In step S123, when a new file is created in the directory, one of the sub-regions is selected according to the hash value of the new file.

In step S124, an inode of the selected sub-region is allocated for use by the new file. For example, the r-th sub-region $(I_{x+rk/L}, I_{x+(r+1)k/L-1})$ in the sub-regions may be selected as the selected sub-region, wherein r=F % L and F is the hash value of the name of the new file. In other words, r is the remainder obtained by dividing the hash value of the name of the new file by the number L of the sub-regions.

In another embodiment, the number of inodes included in each sub-region may not be completely the same or may be completely different. In this case, when a new file is created in the directory, the r-th sub-region in the sub-regions may still be selected, and an inode in the r-th sub-region may be allocated for use by the new file.

For example, when the number of inodes included in each sub-region of the range is not exactly the same or is completely different, the sub-regions may be expressed as $(I_x, I_{x+s1-1})$, $(I_{x+s1}, I_{x+s2-1})$, . . . , $(I_{x+s(L-1)}, I_{x+sL-1})$. The parameters (s1, s2, . . . , sL) determining the length of each sub-region may be recorded in a table. However, since the hash values of the files are sufficiently randomly distributed, the inodes can be allocated more efficiently when the number of inodes of each sub-region is the same.

In addition, after the file system activates the directory order mode in step S120, the file system may gather the previously scattered inodes of the files in the directory into the sub-regions corresponding to the files according to the aforementioned correspondence between the files and the sub-regions so as to conform to the allocation principles of the directory order mode. Therefore, if the algorithm used by the file system to calculate the hash values is sufficiently random, it can ensure that each sub-region is used evenly and fully.

Figure 2:
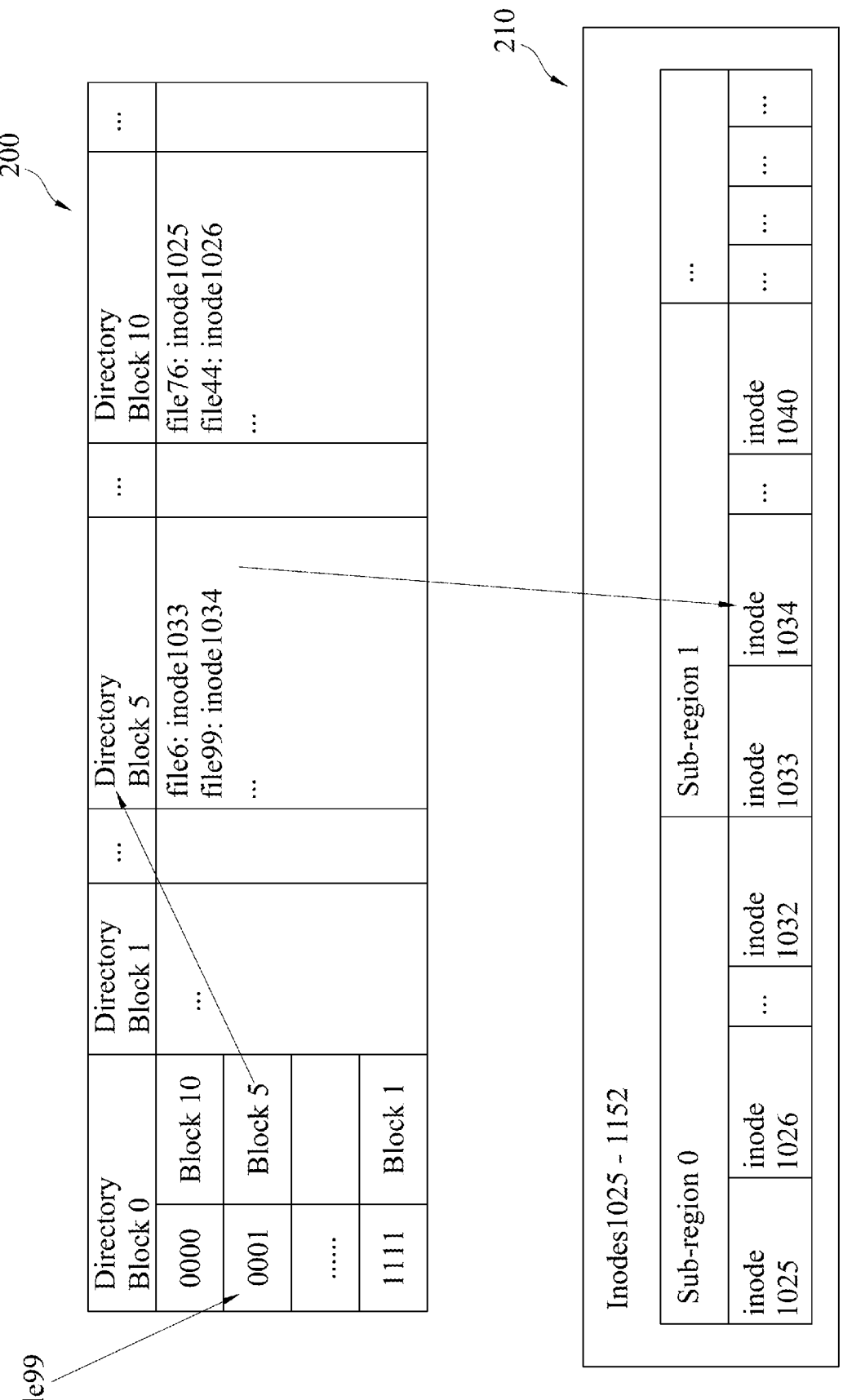
FIGS. 2 to 6 are schematic allocation diagrams of the index node allocation method according to different embodiments of the present disclosure.

FIG. 2 is a schematic allocation diagram of the index node allocation method according to an embodiment of the present disclosure. As shown in FIG. 2, the directory 200 includes multiple files and multiple blocks.

In an embodiment, in the table in block 0 of the directory 200, the files are sorted according to the tail number (that is, the last four bits) of the hash value of the name of each file. The blocks record the numbers of the inodes allocated to the files, except for block 0. The table in block 0 records the correspondence between the tail number of each file and the number of the block that records the number of the inode allocated to the file. For example, the file system allocates the range 210 including 128 consecutive inodes numbered from 1025 to 1152 to the directory 200 for use by files in the directory 200. The file system divides the range 210 into 16 sub-regions. Each sub-region includes 8 consecutive inodes. For example, sub-region 0 of the range 210 includes 8 consecutive inodes numbered from 1025 to 1032, sub-region 1 of the range 210 includes 8 consecutive inodes numbered from 1033 to 1040, and so on.

In this embodiment, the tail numbers of hash values of the files are 4 bits long, and $2^4$ is equal to 16, which is the number L of the sub-regions. Therefore, the tail number of the hash value of each file is equal to the remainder r obtained by dividing the hash value of the file by the number L of the sub-regions. In other words, for those files with the same tail number, their inodes are all located in the same sub-region.

Taking the file file99 as an example, the tail number of the hash value of the file file99 is 0001, which corresponds to sub-region 1, and also corresponds to block 5 in the table in block 0. Therefore, the file system may allocate an inode in sub-region 1 of the range 210 for use by the file file99. For example, the file system allocates inode 1034 to file99, and records the inode number 1034 of file99 in block 5. After that, when it is necessary to access the metadata of the file file99, the file system can know that the inode number of the file file99 is recorded in block 5 from the table in block 0, and obtain the inode number 1034 of the file file99 from block 5, and then access the metadata of file99 in inode 1034.

In addition, when all the inodes of any sub-region in the first range allocated to a directory have been allocated for use by the files of the directory, the file system may similarly allocate the second range or region including k consecutive inodes in the unused inodes for use by the files in the directory. In an embodiment, the second range may be expressed as $(I_y, I_{y+k-1})$, wherein $I_y$ and $I_{y+k-1}$ are respectively the first inode and the last inode of the second range, y is the number of the first inode of the second range, and y+k−1 is the number of the last inode of the second range. The file system may divide the second range into multiple sub-regions.

In an embodiment, each of the sub-regions includes the same number of inodes. For example, the k inodes of the second range may be similarly divided into L sub-regions, and the sub-regions may be expressed as $(I_y, I_{y+k/L-1})$, $(I_{y+k/L}, I_{y+2k/L-1})$, . . . , $(I_{y+(L-1)k/L}, I_{y+k-1})$.

In addition, when the number of inodes required by any file in the directory exceeds the number of inodes that the selected sub-region corresponding to the file in the first range can provide (for example, the file has just been created and needs an inode, and the inodes of the selected sub-region have all been allocated to other files), the file system selects one of the sub-regions of the second range according to the hash value of the file (for example, the hash value of the name of the file), and allocates an inode in the selected sub-region of the second range for use by the file. For example, the r-th sub-region $(I_{y+rk/L}, I_{y+(r+1)k/L-1})$ of the sub-regions of the second range may be similarly selected as the selected sub-region, wherein r is the remainder obtained by dividing the hash value of the file by the number L of the sub-regions of the second range.

In another embodiment, the number of inodes included in each sub-region of the second range may be not exactly the same or may be completely different, wherein the sub-regions may be expressed as $(I_y, I_{y+s1-1})$, $(I_{y+s1}, I_{y+s2-1})$, . . . . , $(I_{y+s(L-1)}, I_{y+sL-1})$. The parameters (s1, s2, . . . , sL) determining the length of each sub-region may be recorded in a table. However, since the hash values of the files are sufficiently randomly distributed, the inodes can be allocated more efficiently when the number of inodes of each sub-region is the same.

After that, when a new file is created in the directory, and the selected sub-region of the new file in the first range still has at least one inode that can be allocated to the new file, the file system allocates an inode of the selected sub-region of the first range for use by the new file. Conversely, if all the inodes of the selected sub-region of the first range have been allocated to other files, the file system allocates an inode of the selected sub-region corresponding to the file in the second range for use by the new file. In addition, when all the inodes of any sub-region in the second range have been allocated to the files in the directory, the file system may allocate another range of inodes for use by the files in the directory, and so on.

Figure 3:
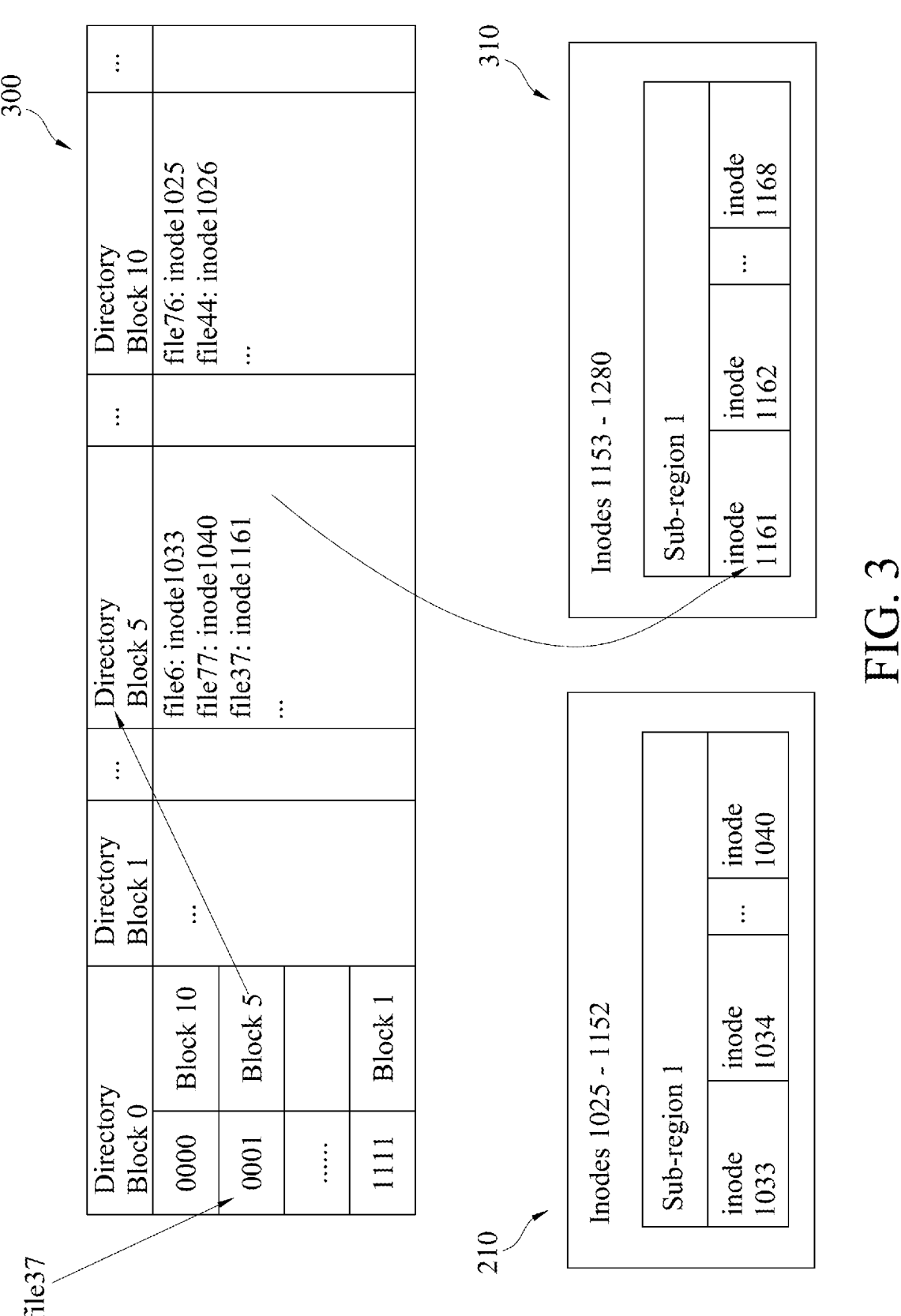

FIG. 3 is a schematic allocation diagram of the index node allocation method according to an embodiment of the present disclosure. As shown in FIG. 3, the file system allocates the range 210 including 128 consecutive inodes numbered from 1025 to 1152 to the directory 300 for use by the files of the directory 300, and the file system divides the range 210 into 16 sub-regions. Each sub-region includes 8 consecutive inodes.

After that, the inodes of at least one sub-region of the range 210 have all been allocated to files of the directory 300, thus the file system further allocates the range 310 including 128 consecutive inodes numbered from 1153 to 1280 to the directory 300 for use by the files of the directory 300. The file system divides the range 310 into 16 sub-regions, and each sub-region includes 8 consecutive inodes.

Take the file file37 as an example. The file file37 needs an inode, but the inodes of sub-region 1 that corresponds to the file file37 in the range 210 have all been allocated to other files. Therefore, the file system allocates an inode of sub-region 1 that corresponds to the file file37 in the range 310 to the file file37. For example, the file system allocates inode 1161 for use by the file file37, and records the inode number 1161 of file37 in block 5.

In an embodiment, a file in the directory may have too much metadata to be completely stored in the inode of the file. Therefore, the file system may allocate the third range or region including wk consecutive inodes in the unused inodes for storing the metadata of the file. In an embodiment, the third range may be expressed as $(I_z, I_{z+wk-1})$, wherein $I_z$ and $I_{z+wk-1}$ are respectively the first inode and the last inode of the third range, w is a positive integer, z is the number of the first inode of the third range, and z+wk−1 is the number of the last inode of the third range. The file system divides the third range into multiple sub-regions.

In an embodiment, each of the sub-regions includes the same number of inodes. For example, the wk inodes of the third range may be similarly divided into L sub-regions, and the sub-regions may be expressed as $(I_z, I_{z+wk/L-1})$, $(I_{z+wk/L}, I_{z+2wk/L-1})$, . . . , $(I_{z+(L-1)wk/L}, I_{z+wk-1})$.

In addition, when the metadata of a file in the directory is too large to be completely stored in the original inode of the file, the file system selects one of the sub-regions of the third range according to the hash value of the file (for example, the hash value of the name of the file) and allocates w inodes in the selected sub-region of the third range for storing the metadata of the file, wherein the metadata may include the extended attributes and/or the access control list of the file. For example, the r-th sub-region $(I_{z+rwk/L}, I_{z+(r+1)wk/L-1})$ in the sub-regions may be similarly selected as the selected sub-region, wherein r is the remainder obtained by dividing the hash value of the file by the number L of the sub-regions of the third range.

In another embodiment, the number of inodes included in each sub-region of the third range may be not exactly the same or may be completely different, wherein the sub-regions may be expressed as $(I_z, I_{z+s1-1})$, $(I_{z+s1}, I_{z+s2-1})$, . . . , $(I_{z+s(L-1)}, I_{z+sL-1})$. The parameters (s1, s2, . . . , sL) determining the length of each sub-region may be recorded in a table. However, since the hash values of the files are sufficiently randomly distributed, the inodes can be allocated more efficiently when the number of inodes of each sub-region is the same.

Figure 4:
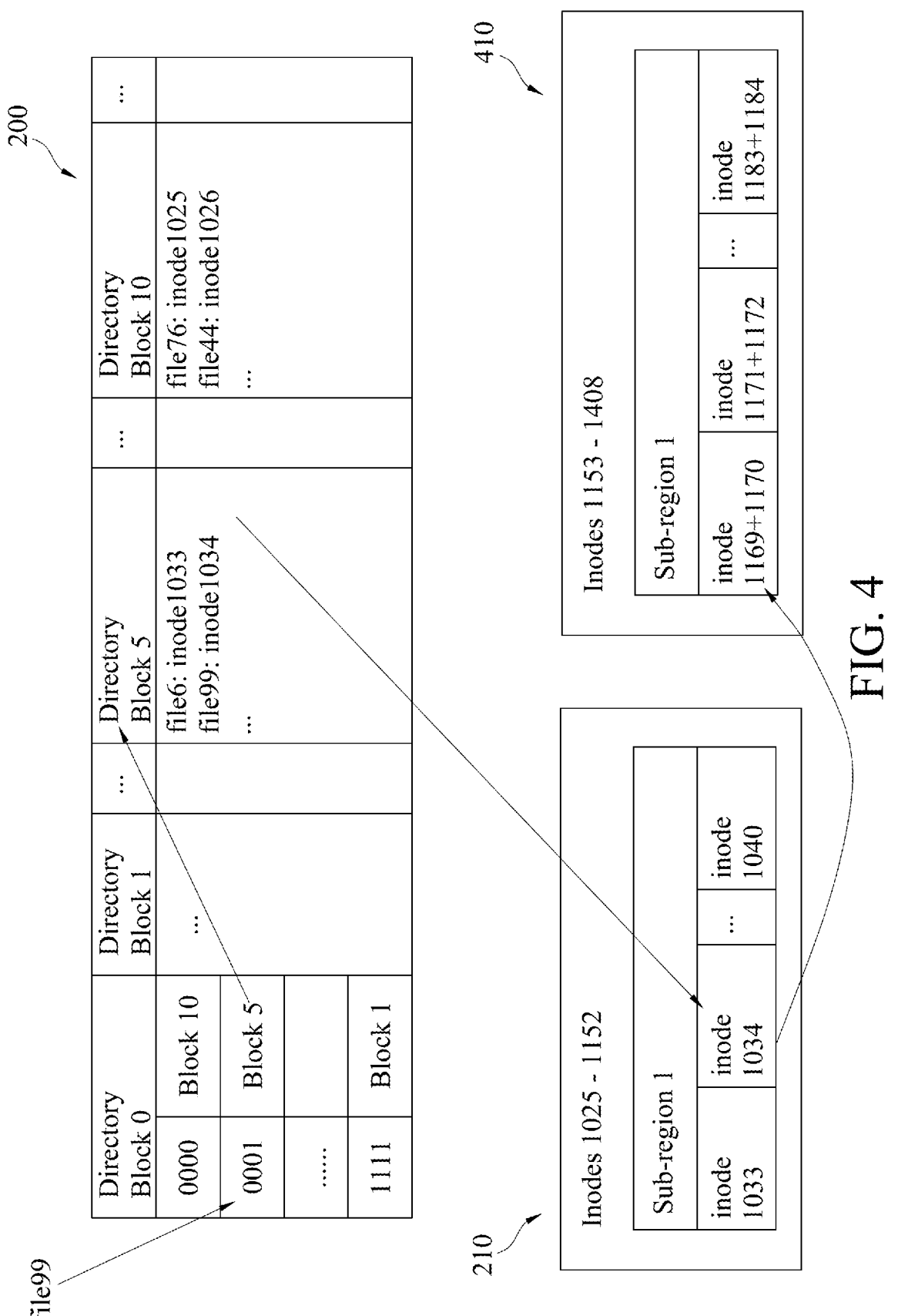
Figure 5:
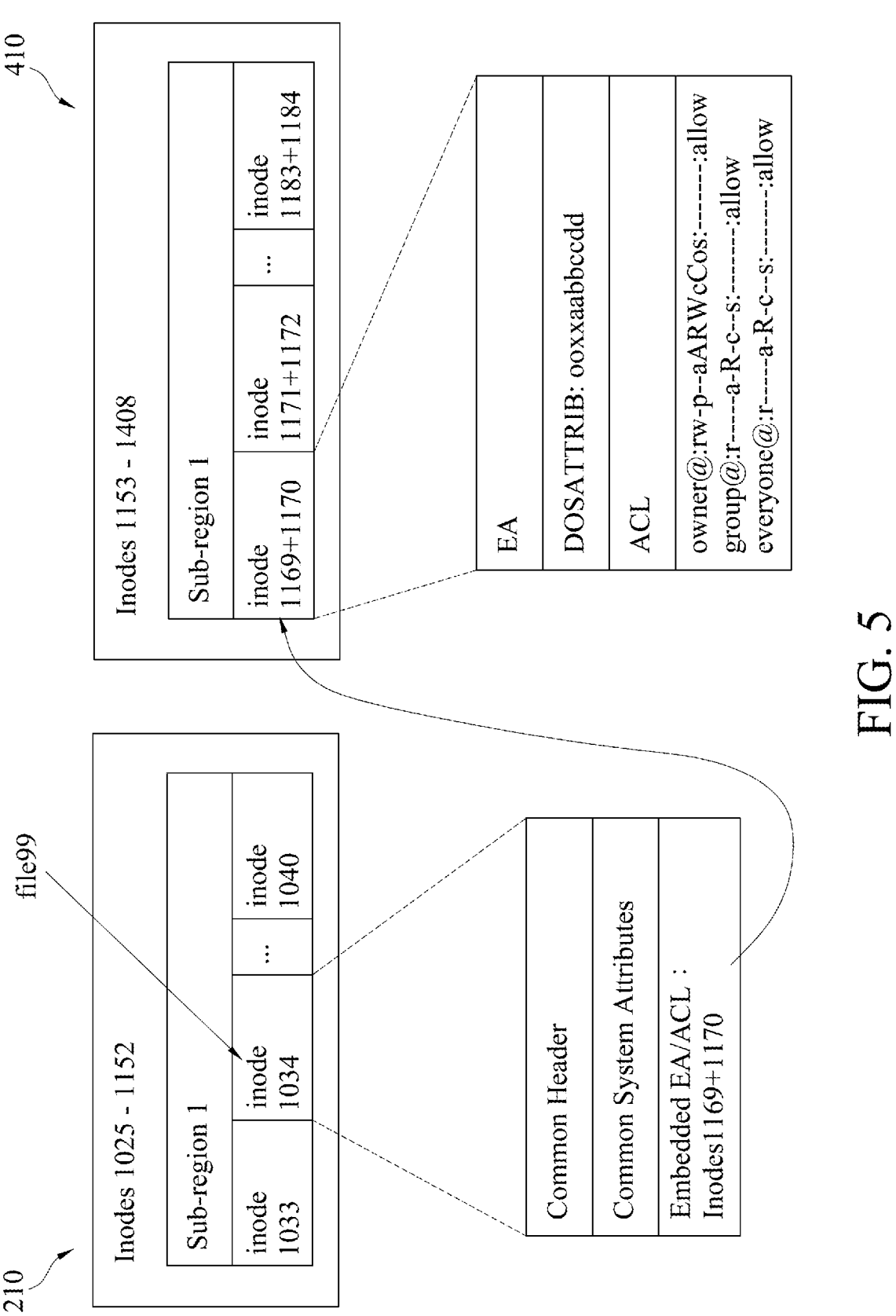

FIGS. 4 and 5 are schematic allocation diagrams of the index node allocation method according to an embodiment of the present disclosure. As shown in FIGS. 4 and 5, the file system first allocates the range 210 including 128 consecutive inodes numbered from 1025 to 1152 to the directory 200 for use by the files in the directory 200, and then allocates the range 410 including 256 consecutive inodes (w equals 2) numbered from 1153 to 1408 to the directory 200 for storing the metadata of the files. The range 210 is divided into 16 sub-regions, and each sub-region includes 8 consecutive inodes. The range 410 is divided into 16 sub-regions, and each sub-region includes 16 consecutive inodes. For example, sub-region 1 of the range 410 includes 16 consecutive inodes numbered from 1169 to 1184.

Taking the file file99 as an example, the tail number of the hash value of file99 is 0001, which corresponds to sub-region 1, and also corresponds to block 5 in the table in block 0. Therefore, the file system allocates the inode 1034 of sub-region 1 of the range 210 to file99, and records the inode number 1034 of file99 in block 5. Subsequently, because the amount of metadata of the file file99 is too large to be completely stored in the inode 1034, the file system allocates the two inodes 1169 and 1170 of sub-region 1 of the range 410 to the file file99 for storing the extended attributes and/or the access control list of file99, and records where the extended attributes and/or the access control list of file99 is/are restored (inodes 1169 and 1170) in inode 1034.

When it is necessary to access the extended attributes and/or the access control list of the file file99, the file system can look up the table in block 0 to know that block 5 records the inode number of the file file99, and the inode number 1034 of the file file99 can be obtained from block 5, and then the file system can look up inode 1034 to know that the extended attributes and/or the access control list of file99 is/are stored in inodes 1169 and 1170, and then the extended attributes and/or the access control list of file99 can be accessed in inodes 1169 and 1170.

In addition to the third range mentioned above, the file system may further allocate the fourth range or region including w'k consecutive inodes in the unused inodes for storing the metadata of the files. In an embodiment, the fourth range may be expressed as $(I_{z'}, I_{z'+w'k-1})$, wherein $I_{z'}$ and $I_{z'+w'k-1}$ are respectively the first inode and the last inode of the fourth range, w' is a positive integer, z' is the number of the first inode of the fourth range, and z'+w'k−1 is the number of the last inode of the fourth range. The division and allocation of the fourth range are similar to those of the third range, just like the division and allocation of the second range are similar to those of the first range.

In addition, when the amount of metadata of a file is too large to be completely stored in the w inodes in the third range allocated to the file, the file system may allocate w' inodes in the selected sub-region corresponding to the file in the fourth range for storing the part of the metadata of the file that exceeds the capacity of the w inodes of the third range. If the fourth range is not enough for storing all of the metadata, the file system may further allocate another range for storing additional metadata, and so on.

Figure 6:
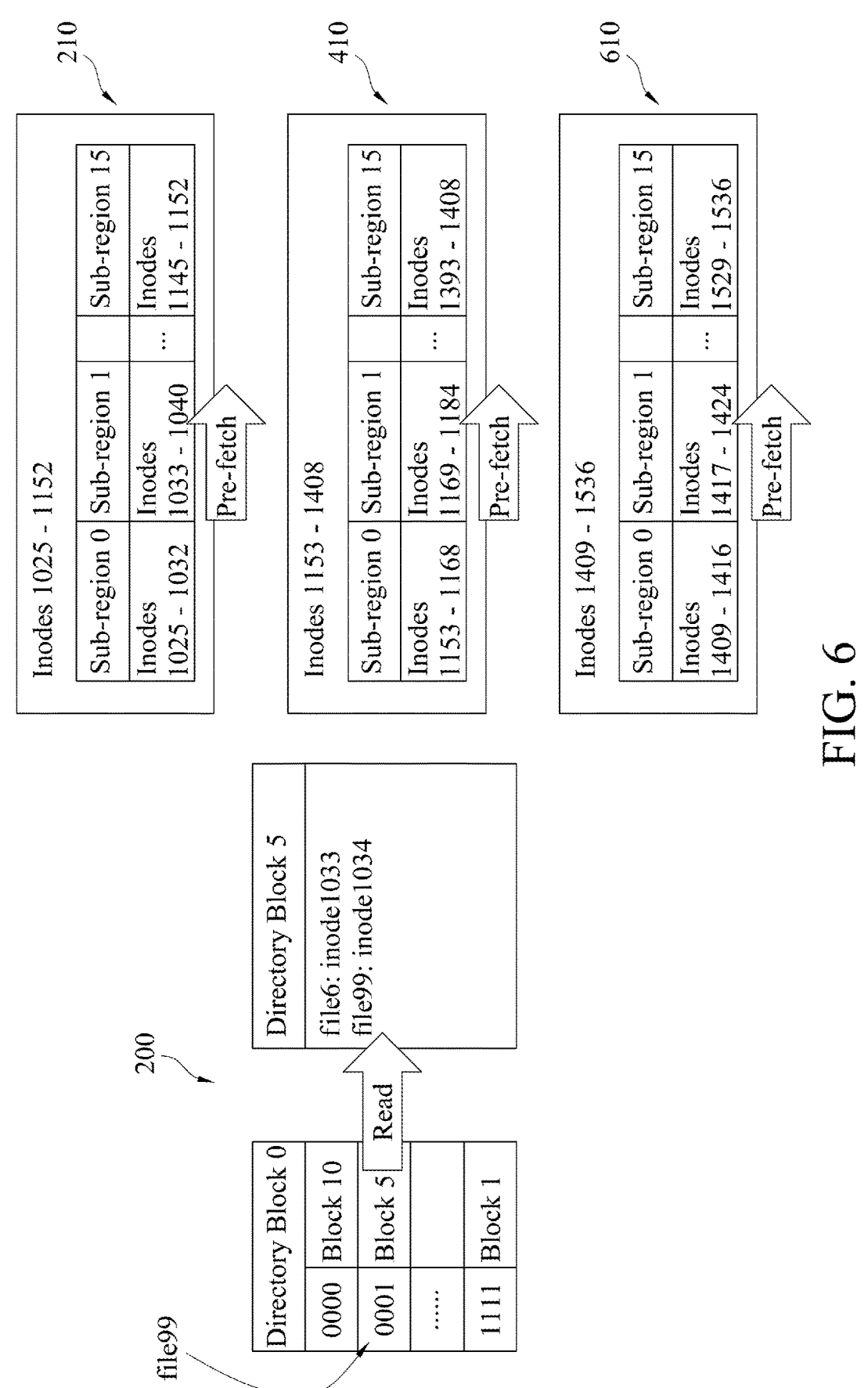

FIG. 6 is a schematic allocation diagram of the index node allocation method according to an embodiment of the present disclosure. As shown in FIG. 6, the file system allocates a range 210 including 128 consecutive inodes numbered from 1025 to 1152 to the directory 200 for use by the files of the directory 200, and divides the range 210 into 16 sub-regions, wherein each sub-region includes 8 consecutive inodes. Next, the file system allocates a range 410 including 256 consecutive inodes numbered from 1153 to 1408 to the directory 200 for storing metadata, such as extended attributes and/or access control lists, of the files in the directory 200, and divides the range 410 into 16 sub-regions, wherein each sub-region includes 16 consecutive inodes. Subsequently, the inodes of at least one sub-region of the range 210 have all been allocated to the files of the directory 200, so the file system further allocates a range 610 including 128 consecutive inodes numbered from 1409 to 1536 to the directory 200 for use by the files of the directory 200, and divides the range 610 into 16 sub-regions, wherein each sub-region includes 8 consecutive inodes.

In this embodiment, the tail numbers of the hash values of the files are 4 bits long, and $2^4$ is equal to 16, which is the number L of the sub-regions in each range. Therefore, the tail number of the hash value of each file is equal to the remainder r obtained by dividing the hash value of the file by the number L of the sub-regions. In other words, files with the same tail number all correspond to the same directory block, and all correspond to the same sub-region number. For example, files with the same tail number 0000 all correspond to directory block 10 and sub-regions 0 of the ranges 210, 410 and 610. For another example, files with the same tail number 0001 all correspond to directory block 5 and sub-regions 1 of the ranges 210, 410 and 610, and so on.

As mentioned above, the files in the directory 200 are sorted according to the tail numbers of their hash values, and files with the same tail number all correspond to the same sub-region number. Therefore, when the file system executes the traversal of the directory 200, the file system only needs to pre-fetch the sub-regions in each range according to the order of the sub-regions in each range. For example, the file system first pre-fetches sub-regions 0 of the ranges 210, 410 and 610, and then pre-fetches sub-regions 1 of the ranges 210, 410 and 610, and so on. In this way, the file system can quickly access the inode of each file according to the order in the directory without having to read a large number of scattered inodes randomly.

The present disclosure also provides a data processing device, such as a smart phone, a computer, a server, or any other electronic device with functions of data processing and storage. A file system is installed in the data processing device for executing the aforementioned index node allocation method.

The present disclosure further provides a non-transitory computer-readable medium, such as a memory, a floppy disk, a hard disk or an optical disk. The computer-readable medium is applicable to the data processing device and stores instructions for executing the aforementioned index node allocation method.

In summary, each file in the directory of the file system of the present disclosure corresponds to one of the blocks in the directory according to the tail number of the hash value of the file. Therefore, when looking up the metadata of a single file, the file system only needs to scan the directory block corresponding to the file to obtain the inode number of the file without having to scan the entire directory. In addition, when performing directory traversal, the file system only needs to pre-fetch the sub-regions according to their order in each range to quickly obtain the inode number of each file according to the directory order without having to read a large number of scattered inodes randomly. Hence, the present disclosure can quickly look up a single file and quickly traverse an entire directory with high speed.

While some of the embodiments of the present disclosure have been described in detail above, it is, however, possible for those of ordinary skill in the art to make various modifications and changes to the particular embodiments shown without substantially departing from the teaching and advantages of the present disclosure. Such modifications and changes are encompassed in the spirit and scope of the present disclosure as set forth in the appended claims.

The invention claimed is:

1. An index node allocation method for speeding up a directory traversal, applicable to a directory traversal system installed in a data processing device and executed by a processor of the data processing device, the index node allocation method comprising the steps of:

activating a directory order mode when a total number of inodes used by files in a directory in the directory traversal system is greater than a preset threshold value;

allocating a first range comprising a plurality of consecutive inodes to the directory when the directory order mode is already activated, wherein each of the consecutive inodes is configured to store metadata of one of the files in the directory;

dividing the first range into a plurality of first sub-regions of consecutive inodes, wherein the files in the directory are sorted according to tail numbers of hash values of the files, and wherein the tail number of each of the files in the directory is a remainder obtained by dividing the hash value of the file by a total number of the first sub-regions;

gathering previously scattered inodes of the files into the first sub-regions so that inodes of the files with the same tail number are located in the same first sub-region of consecutive inodes;

selecting one of the first sub-regions according to a tail number of a hash value of a new file when the new file is created in the directory to allocate a first inode of the selected one of the first sub-regions for use by the new file; and allocating a second range comprising a plurality of consecutive inodes for use by the files in the directory when all inodes of any one of the first sub-regions have been allocated for use by the files in the directory.

2. The index node allocation method according to claim 1, wherein the hash values of the files are hash values of names of the files.

3. The index node allocation method according to claim 1, wherein each of the first sub-regions comprises a same number of inodes.

4. The index node allocation method according to claim 1, wherein each of the first sub-regions comprises a different number of inodes.

5. The index node allocation method according to claim 1, further comprising the steps of:

dividing the second range into a plurality of second sub-regions; and when a number of inodes required by any one of the files in the directory exceeds a number of the inodes that the selected one of the first sub-regions of the first range corresponding to the file provides, selecting one of the second sub-regions of the second range according to the tail number of the file to allocate a second inode of the selected one of the second sub-regions of the second range for use by the file.

6. The index node allocation method according to claim 1, further comprising the steps of:

allocating a third range comprising a plurality of consecutive inodes to the directory;

dividing the third range into a plurality of third sub-regions; and selecting one of the third sub-regions of the third range according to the tail number of the new file to allocate a third inode of the selected one of the third sub-regions of the third range for storing metadata of the new file.

7. The index node allocation method according to claim 6, wherein the metadata of the new file comprises extended attributes and/or an access control list of the new file.

8. A data processing device, comprising a processor for executing an index node allocation method for speeding up a directory traversal in a directory traversal system installed in the data processing device, wherein the index node allocation method comprises:

activating a directory order mode when a total number of inodes used by files in a directory in the directory traversal system is greater than a preset threshold value;

allocating a first range comprising a plurality of consecutive inodes to the directory when the directory order mode is already activated, wherein each of the consecutive inodes is configured to store metadata of one of the files in the directory;

dividing the first range into a plurality of sub-regions of consecutive inodes, wherein the files in the directory are sorted according to tail numbers of hash values of the files, and wherein the tail number of each of the files in the directory is a remainder obtained by dividing the hash value of the file by a total number of the sub-regions;

gathering previously scattered inodes of the files into the sub-regions so that inodes of the files with the same tail number are located in the same sub-region of consecutive inodes;

selecting one of the sub-regions according to a tail number of a hash value of a new file when the new file is created in the directory to allocate an inode of the selected one of the sub-regions for use by the new file; and allocating a second range comprising a plurality of consecutive inodes for use by the files in the directory when all inodes of any one of the sub-regions have been allocated for use by the files in the directory.

9. A non-transitory computer-readable storage medium, storing instructions for controlling a processor of a data processing device for executing an index node allocation method for speeding up a directory traversal in a directory traversal system installed in the data processing device, wherein the index node allocation method comprises:

activating a directory order mode when a total number of inodes used by files in a directory in the directory traversal system is greater than a preset threshold value;

allocating a first range comprising a plurality of consecutive inodes to the directory when the directory order mode is already activated, wherein each of the consecutive inodes is configured to store metadata of one of the files in the directory;

dividing the first range into a plurality of sub-regions of consecutive inodes, wherein the files in the directory are sorted according to tail numbers of hash values of the files, and wherein the tail number of each of the files in the directory is a remainder obtained by dividing the hash value of the file by a total number of the sub-regions;

gathering previously scattered inodes of the files into the sub-regions so that inodes of the files with the same tail number are located in the same sub-region of consecutive inodes;

selecting one of the sub-regions according to a tail number of a hash value of a new file when the new file is created in the directory to allocate an inode of the selected one of the sub-regions for use by the new file; and allocating a second range comprising a plurality of consecutive inodes for use by the files in the directory when all inodes of any one of the sub-regions have been allocated for use by the files in the directory.

* * * * *